United States Patent
Morita et al.

(10) Patent No.: US 6,224,362 B1
(45) Date of Patent: *May 1, 2001

(54) MOLDING DIE FOR MOLDING A COMPONENT OF MAGNETIC TAPE CARTRIDGE

(75) Inventors: Kiyoo Morita; Katsuki Asano; Kazuo Hiraguchi, all of Kanagawa (JP)

(73) Assignee: Fuji Photo Film Co., Ltd., Kanagawa (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/016,396

(22) Filed: Jan. 30, 1998

(30) Foreign Application Priority Data

Jan. 31, 1997 (JP) ............................................. 9-018915
Feb. 20, 1997 (JP) ............................................. 9-036477

(51) Int. Cl.$^7$ ........................... B29C 33/76; B29C 45/04
(52) U.S. Cl. ........................ 425/125; 425/190; 425/575; 425/577
(58) Field of Search ................................. 425/121, 125, 425/129.1, 577, 574, 575, 116, 190, 192 R; 264/275, 255, 328.7, 328.8

(56) References Cited

U.S. PATENT DOCUMENTS

| 4,800,641 | * | 1/1989 | Gelardi et al. ........................ 264/255 |
| 5,472,655 | * | 12/1995 | Morita ................................. 425/129.1 |
| 5,662,854 | * | 9/1997 | Katagiri et al. ....................... 264/255 |
| 5,711,971 | | 1/1998 | vanderSanden . |
| 5,788,906 | * | 8/1998 | Morita ................................. 264/245 |

FOREIGN PATENT DOCUMENTS

| 0 287 203 A2 | 10/1988 | (EP) . | |
| 0 514 761 A2 | 11/1992 | (EP) . | |
| 60-107313 | 6/1985 | (JP) . | |
| 63-168889 | 7/1988 | (JP) . | G11B/23/30 |
| 2-151414 | 6/1990 | (JP) . | |
| 4-351516 | 12/1992 | (JP) . | |
| 8-52765 | 2/1996 | (JP) . | |
| WO 95/15247 | 6/1995 | (WO) . | |
| WO 97/15434 | 5/1997 | (WO) . | |

* cited by examiner

*Primary Examiner*—Angela Ortiz
(74) *Attorney, Agent, or Firm*—Sughrue, Mion, Zinn, Macpeak & Seas, PLLC

(57) ABSTRACT

A molding die for molding a magnetic tape cartridge case in which an electronic part for exchanging a signal with the outside via contacts is incorporated as the need arises is such that a molding die portion for use in molding openings for exposing the contacts of the electronic part is constituted of two kinds of inserts which are alternatively attachable to the molding die proper; and a first insert is used to form openings for exposing the contacts, whereas a second insert is used to shut the openings for exposing the contacts.

7 Claims, 9 Drawing Sheets

MOLDING DIE FOR MOLDING A COMPONENT OF MAGNETIC TAPE CARTRIDGE

BACKGROUND OF THE INVENTION

The present invention relates to a molding die for a component of molding a magnetic tape cartridge case. In particular, the present invention relates to a magnetic tape cartridge in which an electronic part (e.g. an IC board) for storing information as to managing recorded contents apart from a recording magnetic tape is incorporated as the need arises. In addition, the present invention also relates to a molding die for molding a magnetic tape cartridge having a lid structure.

Heretofore, a magnetic tape cartridge disclosed in Japanese Patent Unexamined Publication No. Sho. 63-168889 is already known, in which cartridge an electronic part (hereinafter referred to as, for example, an IC board as the IC board is often employed) for storing information as to managing recorded contents apart from a recording magnetic tape is incorporated, so that signals are exchanged between a record reproducing apparatus (e.g., hardware such as a tape recorder) and the IC board via its contacts which are exposed outside.

In this case, a cartridge case is provided with openings for use in exposing to the outside the contacts of the IC board incorporated in the cartridge case. When the IC board is incorporated in the cartridge case, the contacts of the IC board shut the inside openings, whereby the contacts on the hardware side can be brought into contact with the contacts of the IC board from the outside.

The aforementioned IC board is incorporated in such a cartridge case only when it is required and not incorporated therein when it is not required. Therefore, the openings are left open when the IC board is not incorporated and this may cause the contacts on the hardware side to be stuck in the openings.

Consequently, a dummy board instead of the IC board is normally incorporated so as to shut the openings from the inside.

In a case where a dummy board is used, the dummy board needs to be newly prepared as a part though a cartridge case remains to be used as a common part and this results in increasing the number of parts and necessitating the work of incorporating the dummy board, thus causing an increase in the cost of production. This is a problem.

In addition to this, with the recent technological innovation in increasing the density of magnetic recording media, magnetic tape cartridges, video tape recorders (hereinafter called "VTRs") and the like are increasingly made compact. Consequently, VTRs tend to become frequently used outdoors for taking photographs of landscapes, persons and the like.

For the reason stated above, there has been put to practical use a magnetic tape cartridge having two to three pieces of lids for covering the whole surface and undersurface of a magnetic tape so as to protect the magnetic tape from dust in consideration of the use of such a magnetic tape cartridge outdoors.

A description will subsequently be given of a conventional magnetic tape cartridge with reference to the accompanying drawings.

As shown in a perspective assembly drawing of FIG. 1, a magnetic tape 114 is stretched over the front of a magnetic tape cartridge 113 and while the magnetic tape 114 is not used, it is covered with an outer lid 115, a top lid 116 and an inner lid 117.

FIGS. 2 and 3 show a perspective and a sectional view of the lid portion, respectively.

The outer lid 115 has an outer lid portion 115a for covering the front of the magnetic tape 114 stretched in an opening portion 120, and side plates 115b for covering the front sides of an upper and a lower half 118, 119. The side plates 115b have a pair of fulcrum pins 115c, which are respectively inserted in a pair of notched portions provided in both front side portions of the upper half 118. The outer lid 115 is set rotatable around the fulcrum pins 115c. Further, a pair of pin holes 115d are made in the upper fronts of the side plates of the outer lid 115.

The top lid 116 has a top lid portion 116a for covering the upper edge of the magnetic tape 114 stretched in the opening portion 120, and side plates 116b for covering the side faces of the upper half 118. A pair of support pins 116c are provided on the side plates 116b of the top lid 116 and rotatably inserted into the pin holes 115d of the outer lid 115.

A pair of thin-wall portions that have been made as thin as the side plates 116b are provided on the respective front side faces of the upper half 118. Further, a pair of grooves for guiding the top lid are formed in the respective thin wall portions, and a pair of guide pins 116d formed on the rear insides of the side plates 116b are slidably mounted in the respective grooves.

A pair of bracket portions 116e are provided on the inside of the top lid 116, and pin holes 116f are formed in the respective bracket portions 116e.

FIG. 4 is a perspective view of the inner lid 117.

The inner lid 117 has an inner lid portion 117a for covering the undersurface of the magnetic tape 114 stretched in the opening portion 120, and side plates 117b. A pair of support pins 117c are provided on the respective side plates 117b of the inner lid 117 and rotatably inserted into the respective pin holes 116f of the bracket portions 116e of the top lid 116. Further, the lower side faces of the inner lid 117 are equipped with a pair of protrusions 117d, which are formed with guide pins 117e, respectively.

A pair of inner lid guide grooves whose top portions are opened are provided in the rear of a pair of tape guides formed in the lower half 119 and both side faces of the opening portion 120, and the pair of guide pins 117e formed on the protrusions 117d of the inner lid 117 are slidably inserted into the inner lid guide grooves.

A process for molding the inner lid 117 thus structured will subsequently be described. As shown in FIG. 5, a cavity 121 for use in molding the inner lid 117 includes a movable metal mold unit 122 and a stationary metal mold unit 123.

The movable metal mold unit 122 and the stationary metal mold unit 123 are placed opposite to each other so that mold breaking and clamping can be carried out by the locking unit of a molding machine, and in such a state that both of them have been clamped together, the cavity is formed. When the cavity 121 is filled with molten resin under pressure by an injection molding machine in such a clamped state before the molten resin is cooled and solidified, the inner lid 117 is formable.

Magnetic tape cartridges are classified into two categories; namely, for general use and for business use and those in both categories are similar in construction except that the inner lids for use in the former are longitudinally shorter than those for use in the latter. When these two kinds of inner lids are manufactured, however, the inner-lid molding method that has conventionally been adopted comprises the steps of preparing a special die for each type and setting the special die in a molding machine in agreement with the type of manufacture. In the molding method like this, troublesome work of removing the molding die from the molding machine, disassembling and assembling the die, mounting the die in the molding machine and so on has to be repeated in order each time the type of manufacture is changed, thus causing the rate of operation to be extremely lowered. Moreover, the cost of equipment tends to increase because kinds of dies to be prepared also increases, which results in incurring an increase in the cost of production. This is also a problem.

SUMMARY OF THE INVENTION

It is, therefore, an object of the present invention to provide a molding die for molding a component of magnetic tape cartridge which can solve the foregoing problem.

It is an object of a first aspect of the present invention to provide a molding die for molding two kinds of magnetic tape cartridge cases, one of which has openings for use in exposing contacts to the outside and the other one has no openings therefor in order to minimize the cost for molding them, so that a dummy board can be dispensed with.

In addition, it is also an object of a second aspect of the present invention to curtail the cost of manufacturing molding dies by employing the die commonly for molding lids so as to effect improvement in the rate of productive operation.

In order to accomplish the aforesaid object of the present invention, a molding die for molding a magnetic tape cartridge case in which an electronic part for exchanging a signal with the outside via contacts is incorporated as the need arises, comprising:

a first and second mold units defining a mold cavity for at least part of the cartridge case; and a first and second inserts alternatively attachable to at least one of the first and second mold units for forming an opening which exposes the contacts of the electronic part, wherein the first insert is used to form openings for exposing the contacts, whereas the second insert is used to shut the openings for exposing the contacts.

In the above-mentioned molding die for molding a magnetic tape cartridge case, the second mold unit preferably has a recess portion capable of receiving the first and second inserts.

In addition, in the above-mentioned molding die for molding a magnetic tape cartridge case, the first and second inserts may be alternatively attached to the recess of the second mold unit by a screw.

With the arrangement stated above, the molding die for molding a case with the first insert is set in the molding die proper when an electronic part is incorporated in the case. Thus, the case formed with openings is obtainable. The molding die for molding a case with the second insert is set in the molding die proper when no electronic part is incorporated in the case. Thus, the case formed without openings is obtainable.

In order to solve the foregoing problems, a molding die for molding a magnetic tape cartridge lid comprising an outer lid, a top lid and an inner lid which are used for covering a magnetic tape is such that:

a portion of the die for molding one end of the lid in the longitudinal direction of the lid is formed with an insert type die; and the insert type die comprises a number of inserts members are alternatively selected and loaded in accordance with a length of the lid in the longitudinal direction.

In order to solve the foregoing problems, further, a molding die for molding a magnetic tape cartridge lid comprising an outer lid, a top lid and an inner lid which are used for covering a magnetic tape is such that:

a portion of the die for molding one end of the lid in the longitudinal direction of the lid is formed with a slide core capable of adjusting molding length in the longitudinal direction of the lid; and the slide core is located in a desired position in the longitudinal direction for injection molding.

Further, the foregoing problem can be solved by a molding die, according to the present invention, for molding at least two kind of magnetic tape cartridge lids, the lids having a different length in a longitudinal direction thereof, comprising:

a stationary mold unit;

a movable mold unit movable relative to the stationary mold unit;

a first insert attached to at least one of the stationary molding unit and the movable mold unit, in which a molding cavity for a shorter length lid is defined by a combination of the stationary mold unit, the movable mold unit and the first insert, and the first insert has a recess corresponding with a part of the molding cavity for molding one end of the shorter length lid in the longitudinal direction thereof; and a second insert attached to at least one of the stationary molding unit and the movable mold unit, in which a molding cavity for a longer length lid is defined by a combination of the stationary mold unit, the movable mold unit and the second insert, and the second insert has a recess corresponding with a part of the molding cavity for molding one end of the longer length lid in the longitudinal direction thereof;

in which the first insert and the second insert are alternatively attached to the at least one of the units.

Furthermore, in the above-mentioned molding die, the first insert is only different from and the second insert in a depth of the recess, preferably.

Moreover, in the above-mentioned molding die, the magnetic tape cartridge lid may be selected from a group consisting of an outer lid, a top lid and an inner lid by which a lid assembly for covering a magnetic tape is constituted.

In addition, in the above-mentioned molding die, in which the magnetic tape cartridge lid is the inner lid.

Still furthermore, the object can be attained by a molding die, according to the present invention, for molding at least two kind of magnetic tape cartridge lids, the lids having a different length in a longitudinal direction thereof, comprising:

a stationary mold unit;

a movable mold unit movable relative to the stationary mold unit; and a slide core disposed at one end of a molding cavity which is defined by a combination of the stationary mold unit, the movable mold unit and the slide core, the slide core being movable in the longitudinal direction between a first position forming a shorter molding cavity for a shorter length lid between the stationary mold unit and the movable mold unit and a second position forming a longer molding cavity for a longer length lid between the stationary mold unit and the movable mold unit.

In the above-mentioned molding die, the magnetic tape cartridge lid may be selected from a group consisting of an outer lid, a top lid and an inner lid by which a lid assembly for covering a magnetic tape is constituted.

In the above-mentioned molding die, in which the magnetic tape cartridge lid is preferably the inner lid.

In the case of an insert type die according to the present invention, the length of a cavity is made changeable by loading a desired insert type die, so that a lid having desired length becomes moldable. In the case of a die with the slide core, the length of a cavity is made changeable by locating the slide core in a desired position, so that a lid having desired length becomes moldable.

The nature, utility and principle of the invention will be more clearly understood from the following detailed description and the appended claims when read in conjunction with the accompanying drawings.

BRIEF DESCRIPTION OF THE DRAWINGS

FIG. 6(a) refers to a case where a first insert is mounted in the molding die so as to form openings; and FIG. 6(b) refers to a case where the second insert is mounted therein so as to shut the openings.

FIG. 7(a) refers to a case where the openings are formed; and FIG. 7(b) refers to a case where openings are shut.

DETAILED DESCRIPTION OF THE PREFERRED EMBODIMENTS

Figure 1:
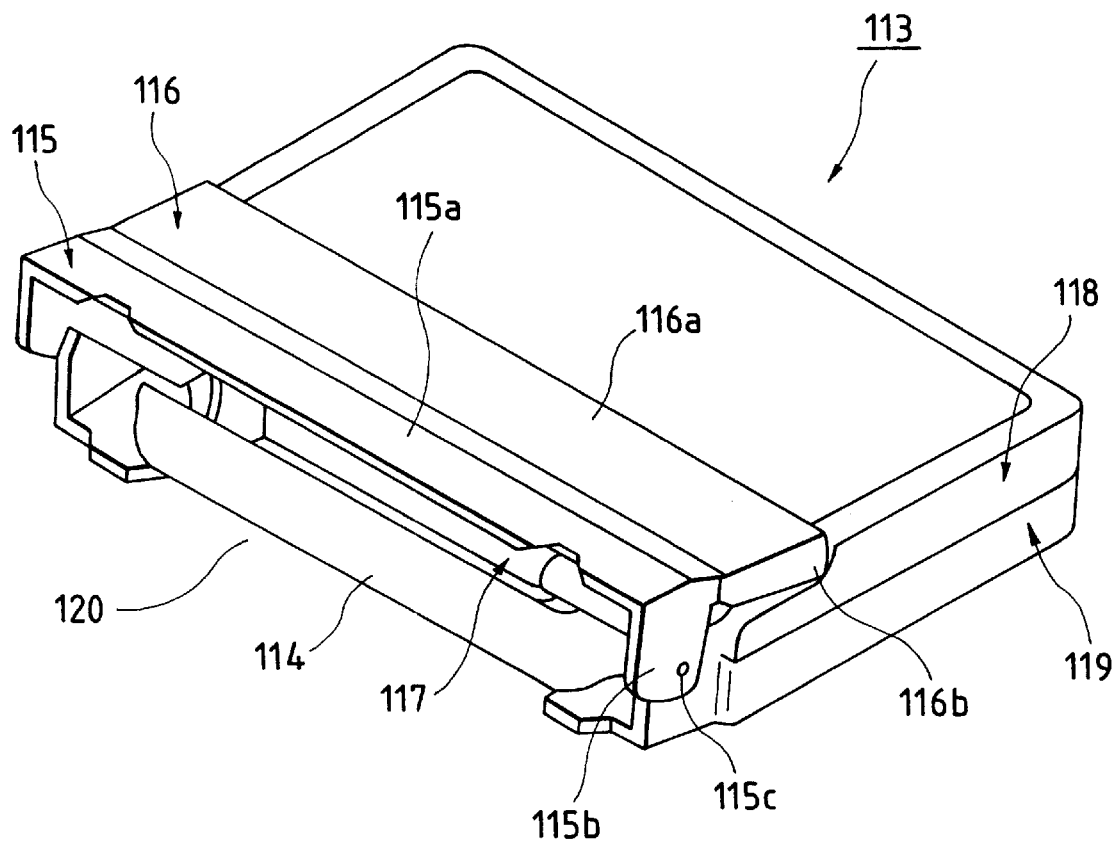
FIG. 1 is a perspective assembly drawing of a magnetic tape cartridge in the prior art.
Figure 2:
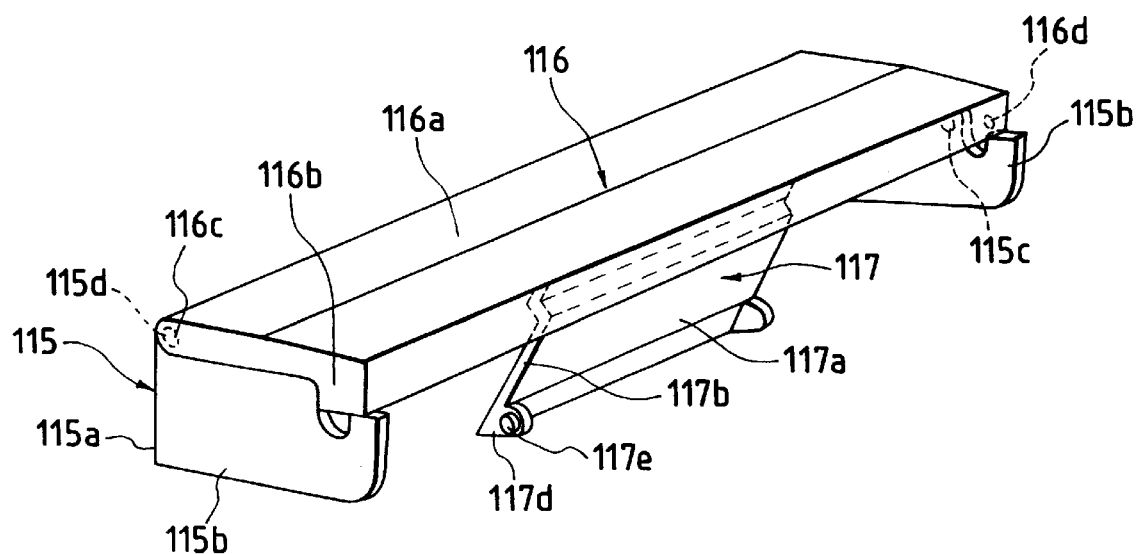
FIG. 2 is a perspective view of a lid portion in the prior art.

Referring to the accompanying drawings, there is given a detailed description of a first embodiment of the present invention.

FIG. 6 is a plan view of the principal part of a case molding die embodying the present invention; FIG. 7, a plan view of the principal part of the lower half of a cartridge case which is molded by the use of the die; FIG. 8, a block diagram showing the whole magnetic tape cartridge as a final product; and FIG. 9, an exploded perspective view of the principal part of FIG. 8.

Referring to FIG. 8 first, there is given a description of a magnetic tape cartridge M.

The magnetic tape cartridge M contains a magnetic tape (not shown) in a cartridge case 1 as a resin molded product. The cartridge case 1 has a lower half 2 (as one of cartridge case half) and an upper half 3 (as the other of cartridge case half) and on one end sides of their rear end walls 2a, 3a exist a control data storage portion 5 for storing, for example, information as to managing recorded contents of the magnetic tape and an erasure-error preventive portion 6. The erasure-error preventive portion 6 has an erasure-error preventive leaf 20 whose pawl portion is exposed to the outside from a hole 21 provided in the rear end wall 3a of the upper half 3.

The control data storage portion 5 is provided as the need arises and not provided when it is unnecessary. In the magnetic tape cartridge M shown in FIG. 8, there is provided the control data storage portion 5 by incorporating an IC board (an electronic part) in the rear end wall 2a of the cartridge case 1. In the rear end wall 2a of the lower half 2, there are also provided openings 11 for exposing to the outside a plurality of contacts 12 of the IC board 10 in such a way as to correspond to the contacts 12.

Figure 9:
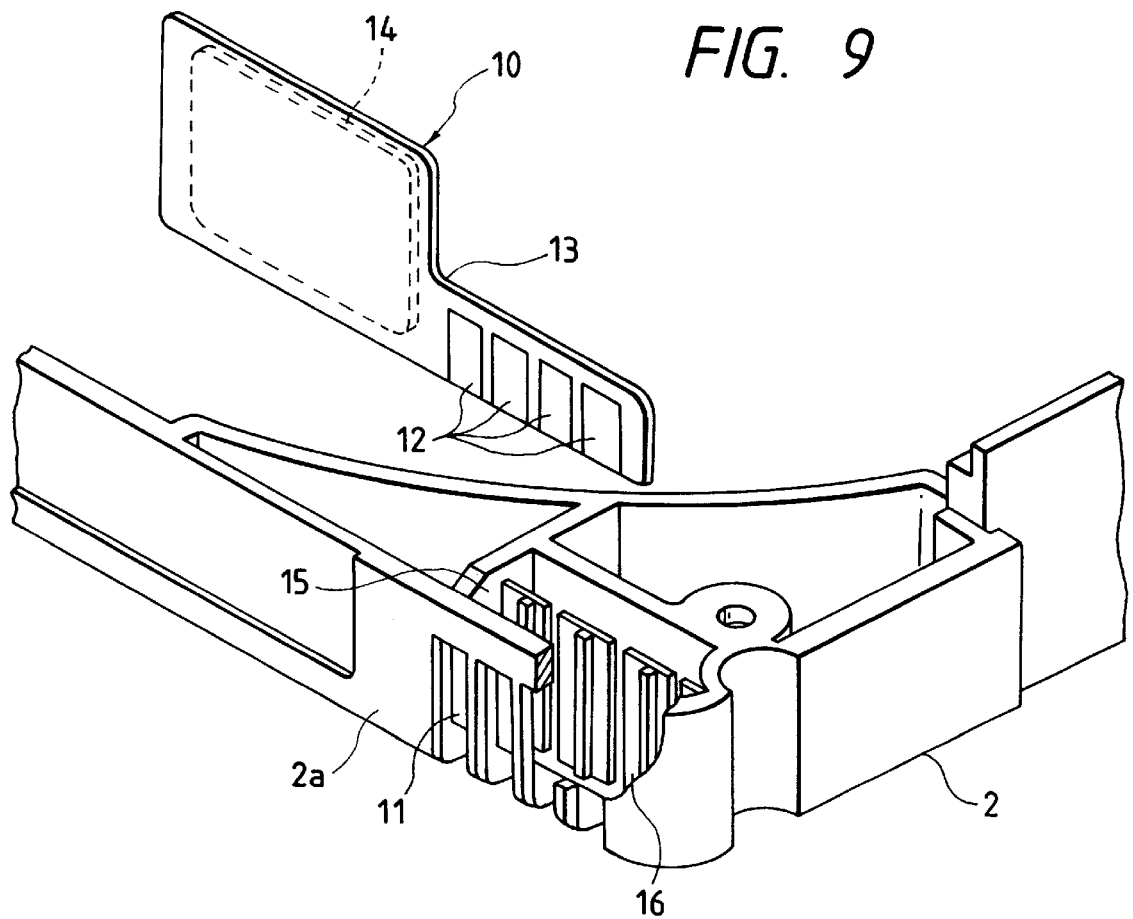
FIG. 9 is an exploded perspective view of the principal part of FIG. 8.

FIG. 9 is a perspective exploded view with the aforementioned partial cutaway control data storage portion 5 intended to make the control data storage portion easily understandable. The IC board 10 includes a circuit 14 and the contacts 12 which are provided in a base plate 13 and is fitted into a housing space 15 which is arranged along the rear end wall 2a of the lower half 2. In such a state that the IC board 10 has been thus fitted, its contacts are exposed to the outside through the openings 11 provided in the rear end wall 2a of the lower half 2. Consequently, contacts on the hardware side can be brought into contact with the contacts 12 through the openings 11. In this case, the rear side of the housing space 15 is partitioned by an elastic wall 16 and the error-erasure preventive leaf (illustration omitted) is placed behind the elastic wall 16.

Although the IC board 10 is incorporated in the cartridge case 1 of the magnetic tape cartridge M to provide the control data storage portion 5, there is also a magnetic tape cartridge of such a type as is provided with no control data storage portion 5. In this case, it is inconvenient to leave the contact exposure openings 11 open in the rear end wall 2a of the lower half 2.

A molding die for molding a case provided according to this embodiment of the present invention is such that two kinds of lower halves 2 with the openings 11 left open and the openings 11 kept shut are molded.

Figure 6A:
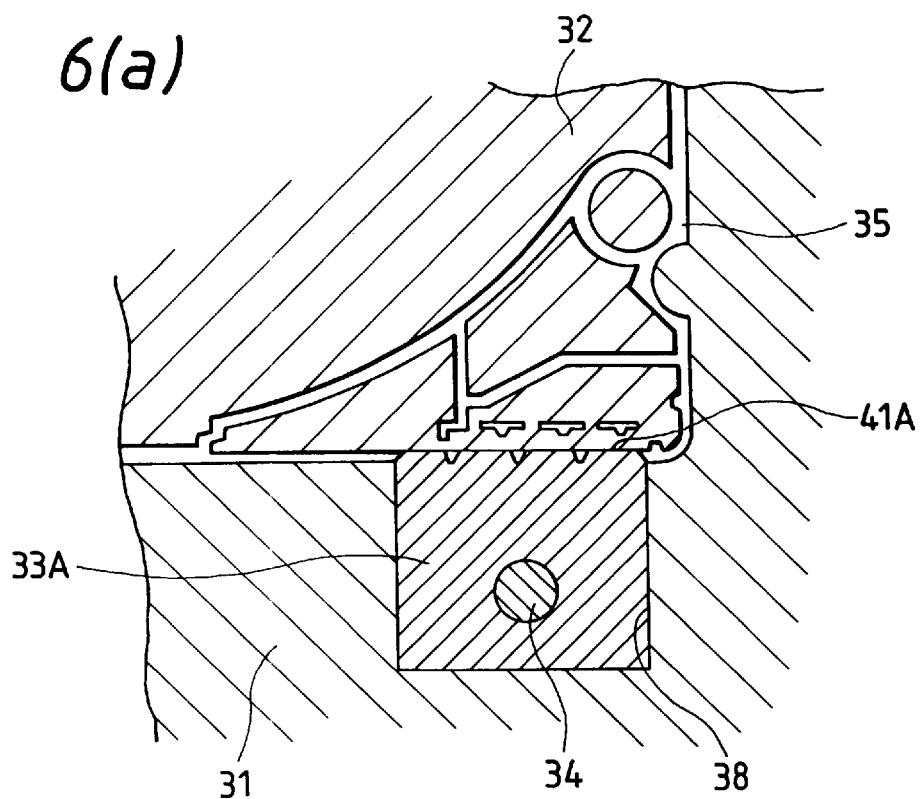
FIGS. 6(a) and 6(b) are plan views of the principal part of a case molding die embodying the present invention.
Figure 6B:
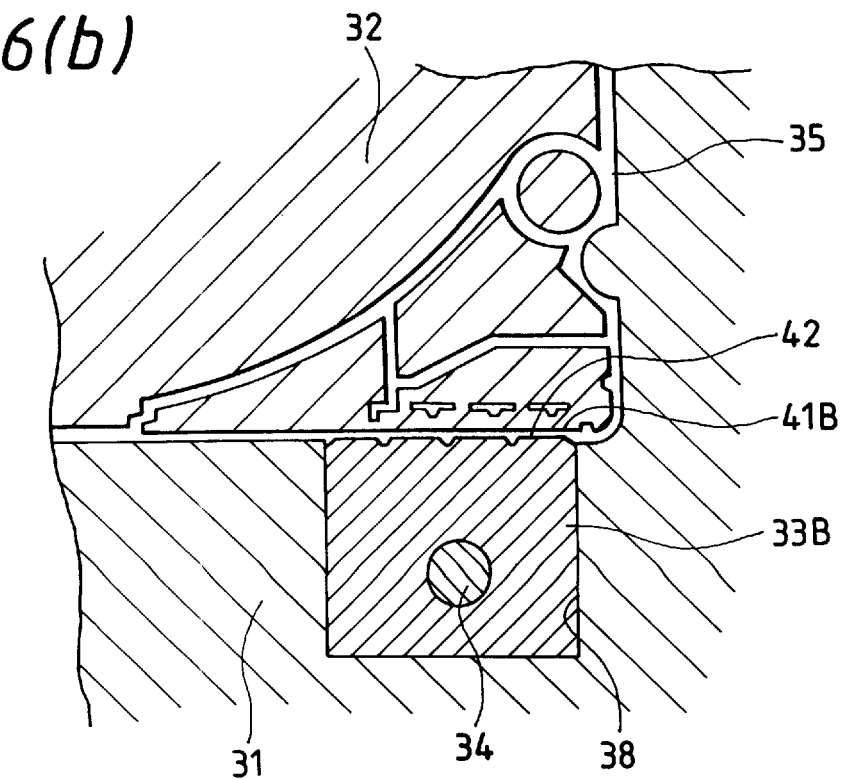

FIG. 6 shows the molding die for molding a case according to this embodiment of the present invention. This molding die comprises a lower mold unit 31, a upper mold unit 32 and two kinds of inserts 33A, 33B. The two kinds of inserts 33A, 33B correspond to molding die portions for forming the openings of the lower half 2 and are alternatively set in a recess 38 formed in the lower mold unit 31 and fixed in position with a fixing screw 34. FIG. 6(a) refers to a case where the first insert 33A is mounted in the lower mold unit 31 and FIG. 6(b) refers to a case where the second insert 33B is mounted in the lower mold unit 31. The first insert 33A is different from the second insert 33B in that only the dimensions of projections of front edge faces 41A, 41B are varied.

Figure 7A:
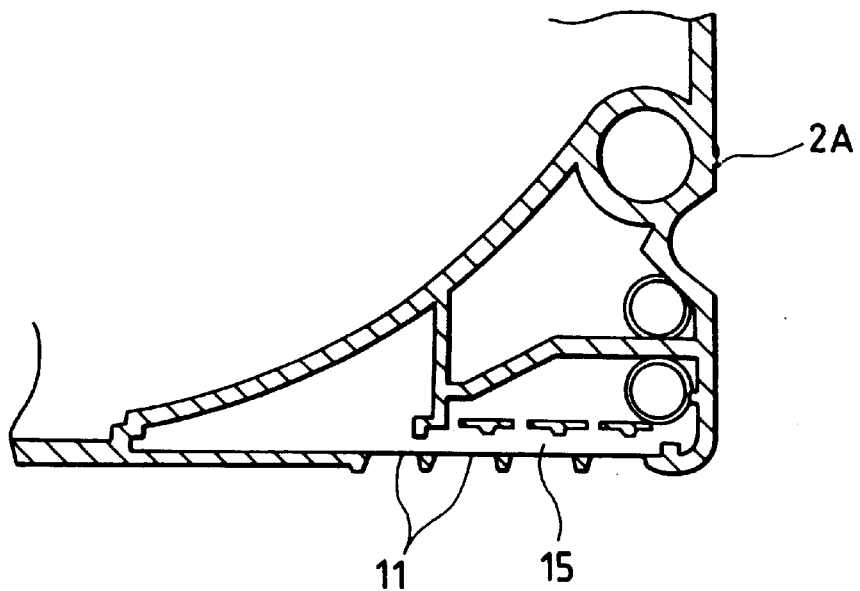
FIGS. 7(a) and 7(b) are plan views of the principal part of the lower half of a cartridge case which is molded by the use of the molding die of FIG. 6.
Figure 8:
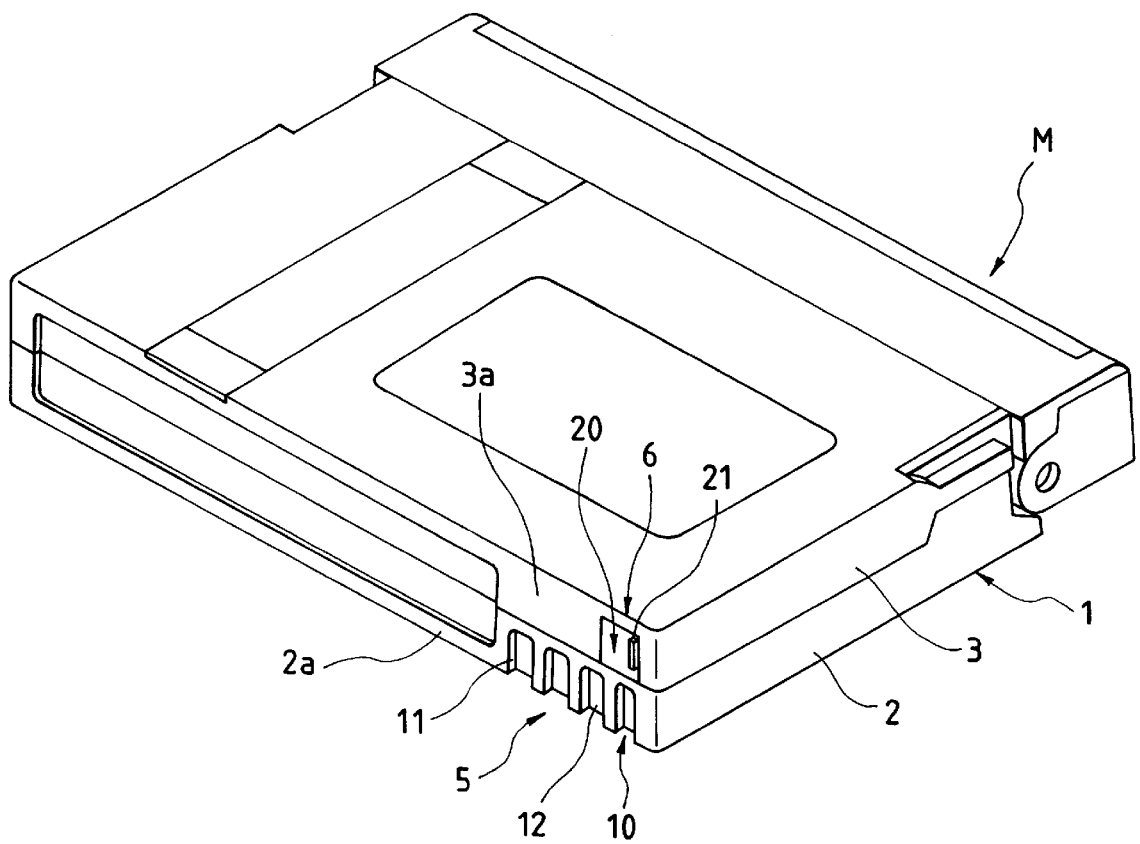
FIG. 8 is a block diagram showing the whole magnetic tape cartridge as a final product.

The first insert 33A is mounted in the lower mold unit 31 when a lower half 2A having the openings 11 as shown in FIG. 7(a) is formed and while the first insert 33A is mounted therein as shown in FIG. 6(a), the front edge face 41A is brought into contact with the edge face of the upper mold unit 32, whereby a gap allowing resin to penetrate into the contact portion is eliminated. Thus, the lower half 2A of a type having the openings 11 as shown in FIG. 7(a) is made formable by injecting resin into a cavity.

Figure 7B:
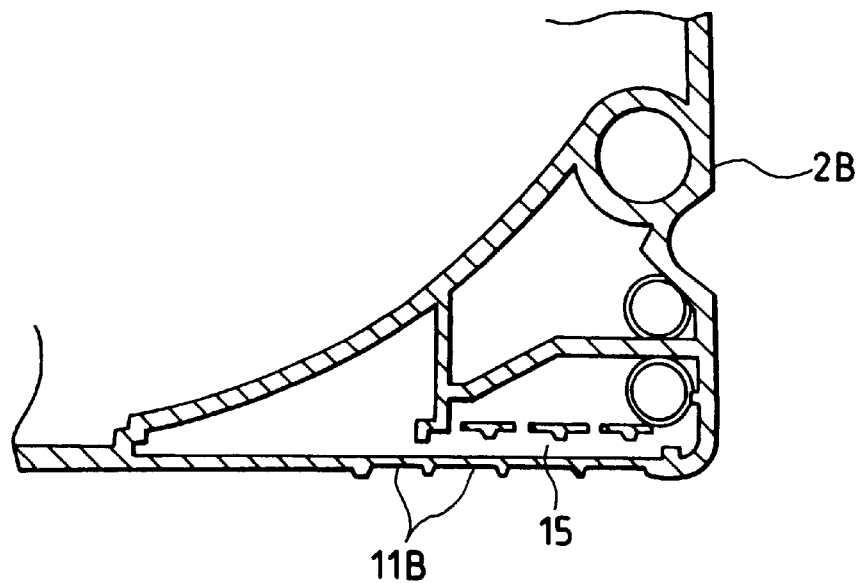

Further, the second insert 33B is mounted in the lower mold unit 31 when the lower half 2A having the openings 11 which are shut with closing walls 11B is formed and while the second insert 33B is mounted therein as shown in FIG. 6(b) whereby to secure the gap allowing resin to penetrate between the front edge face 41B and the edge face of the upper mold unit 32. Thus, the lower half 2A of a type having the closed openings 11 as shown in FIG. 7(b) is made formable thereby. Consequently, a dummy board can be dispensed with when the IC board is not incorporated in the magnetic tape cartridge and the use of the lower half 2B of this type instead has the effect of reducing the cost to the extent that the dummy board is not employed.

With the molding die constituted of the lower mold unit 31 and the upper mold unit 32, the inserts 33A, 33B are alternatively mounted in the molding die according to the desired type of a molded product, whereby the lower half 2A with the openings opened and the lower half 2B with the openings closed can be molded simply with the preparation of only two kinds of inserts 33A, 33B. Thus, an increase in the cost of producing molding dies can be minimized.

As set forth above, the two kinds of cartridge cases with the openings opened and the openings closed are made obtainable simply by preparing only two kinds of inserts and mounting one of them alternatively in the molding die according to the present invention. Therefore, the production cost can be reduced by dispensing with a dummy board without preparing two kinds of molding dies.

Hereinafter, referring to the accompanying drawings of FIGS. 10–12(b), there is given a description of the present invention. Incidentally, a description of the structure of an inner lid will be omitted as the structure thereof is similar to what is shown with reference to the conventional example.

Figure 10:
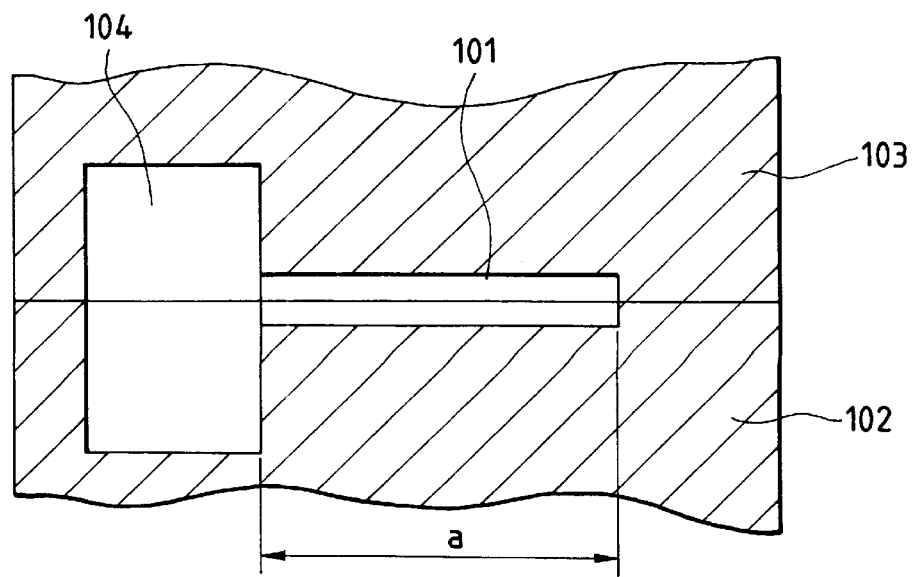
FIG. 10 is a sectional view of the present invention.

A die having an insert type die as a second embodiment of the present invention will be described first. As shown in FIG. 10, a cavity 101 for molding an inner lid used for forming a tape cartridge includes a movable metal mold unit 102 and a stationary metal mold unit 103. The movable metal mold unit 102 is fitted to the movable platen of a molding machine (not shown) via a die plate (a bottom plate). The stationary metal mold unit 103 forming a pair with the movable metal mold unit 102 is fitted to the fixed platen of the molding machine (not shown) via a die plate (a front plate). The molding length (cavity length) a of the stationary metal mold unit 103 is constant and by loading an insert-type die loading portion 104 with insert type dies 105a, 105b different in molding length, cavities different in length can be formed separately.

The movable metal mold unit 102 and the stationary metal mold unit 103 are set opposite to each other so that mold breaking and clamping can be carried out by the locking unit of the molding machine, and in such a state that both of them have been clamped together, the cavity is formed. When the cavity 101 is filled with molten resin under pressure by an injection molding machine in such a clamped state before the molten resin is cooled and solidified, the inner lid is formable.

Figure 11A:
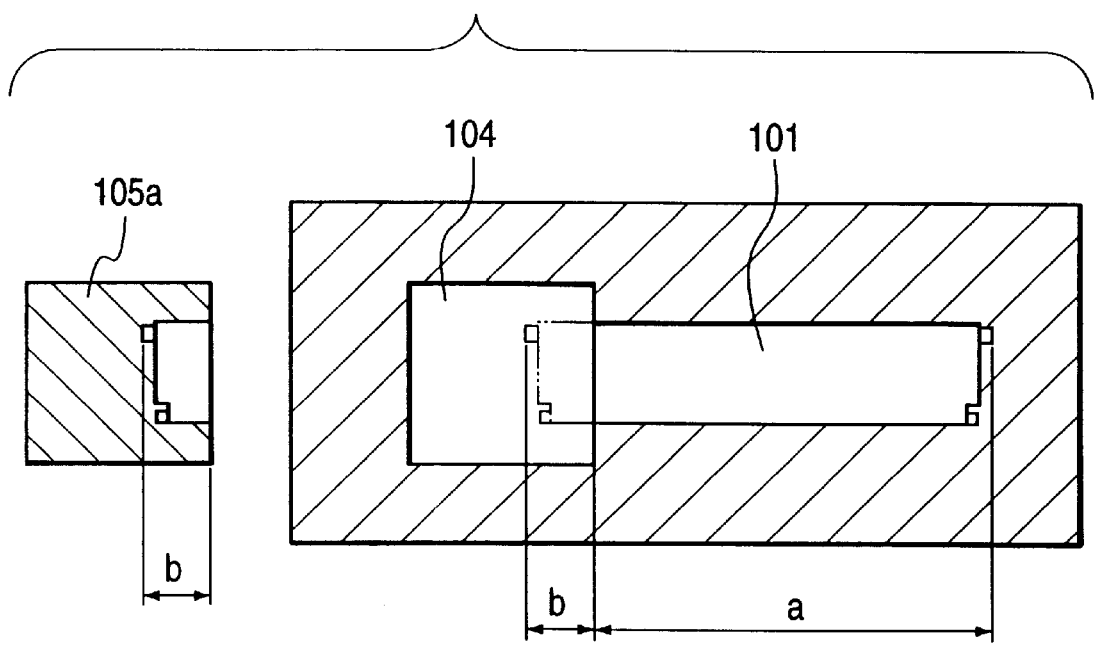
FIG. 11(a) is a sectional view of a molding die for molding an inner lid for general use by utilizing an insert type die according to the present invention.

FIG. 11(a) shows a molding die for molding the inner lid of a DVC (Digital Video Cassette) for general use. The length of the inner lid for general use in the longitudinal direction is a +b. A cavity having a length of a +b is formed by loading the insert type die 105a with a molding portion having a length of b into the insert-type die loading portion 104. The insert type die 105a is used to mold one side plate which is provided with the support pin of the inner lid, a protrusion and a guide pin.

Figure 11B:
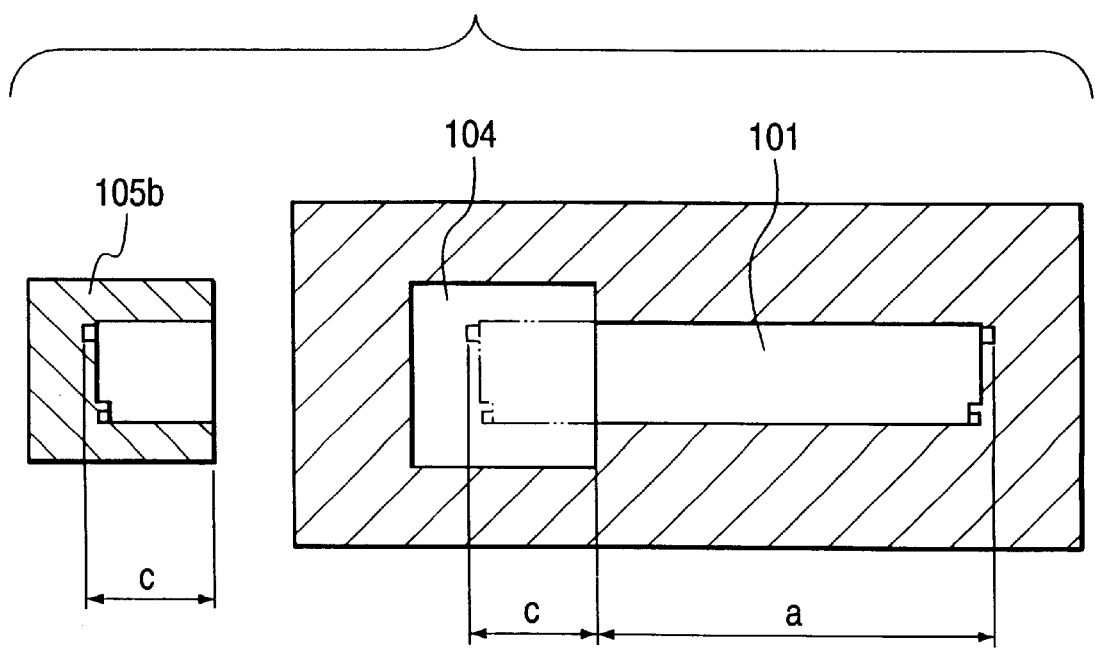
FIG. 11(b) a sectional view of a molding die for molding an inner lid for business use.

FIG. 11(b) shows a molding die for molding the inner lid of a DVC for business use. The inner lid of the DVC for business use and the inner lid of the DVC for general use are different only in longitudinal length. The movable metal mold unit 102 and stationary metal mold unit 103 for business use are the same as those for general use. The longitudinal length of the inner lid for business use is a +c. A cavity having a length of a +c is formed by loading the insert type die 105b with a molding portion having a length of c into the insert-type die loading portion 104 and the insert type die 105b is used to mold the side plate of the inner lid. Thus, the longitudinal length of the cavity is made changeable only by replacing the insert type die. Since it is possible to mold inner lids different in length, the movable metal mold unit 102 and the stationary metal mold unit 103 can be employed for common use.

Figure 12A:
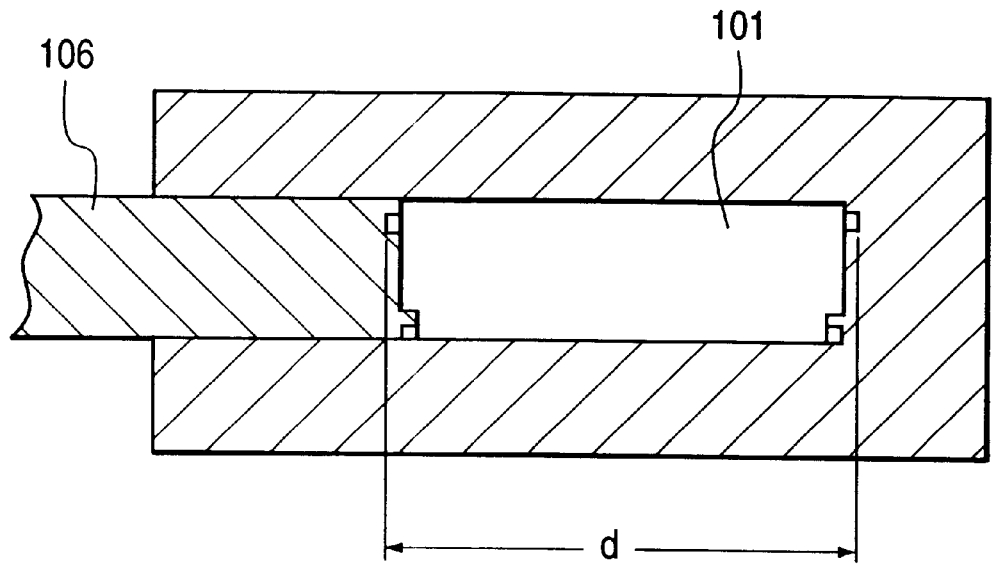
FIG. 12(a) A sectional view of a molding die for molding an inner lid for general use by utilizing a slide core according to the present invention.

A die equipped with a slide core as a third embodiment of the present invention will subsequently be described. FIG. 12(a) shows a molding die for molding an inner lid for general use. The longitudinal length of the inner lid for general use is d (=a+b) and the length d of a cavity is set by adjusting the position of a slide core 106 provided between the movable metal mold unit and the stationary metal mold unit. The slide core 106 is used to mold one of the side plates of the inner lid.

Figure 12B:
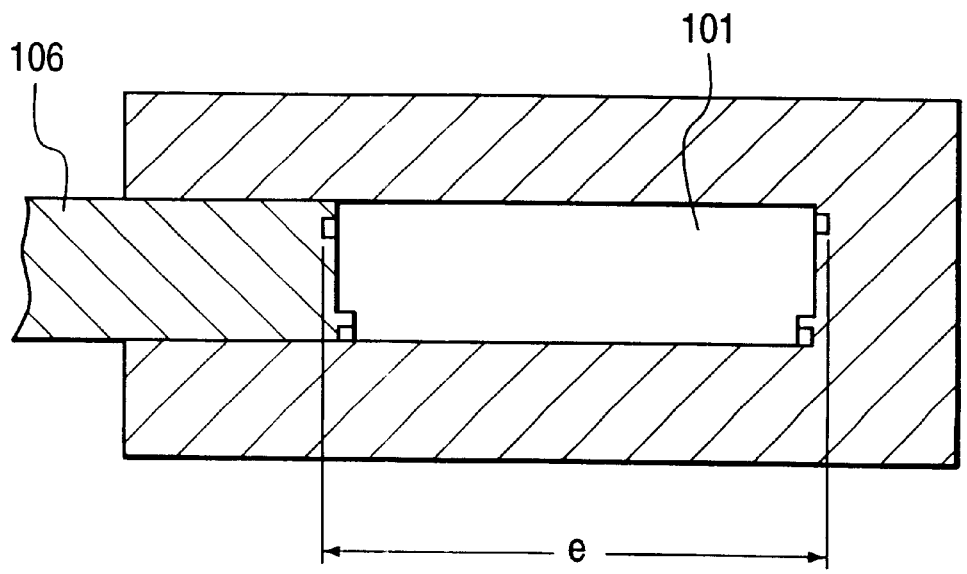
FIG. 12(b) a sectional view of a molding die for molding an inner lid for business use.

FIG. 12(b) shows a molding die for molding an inner lid for business use, which is different from what is for general use in only longitudinal length. The movable metal mold unit and stationary metal mold unit for business use are the same as those for general use. The longitudinal length of the inner lid for business use is e (=a+c) and it is also possible to mold the side plate of the inner lid only by changing the sliding quantity of the slide core for general use to the sliding quantity of the slide core 106 for business use, which is provided between the movable metal mold unit and the stationary metal mold unit. Since the inner lids different in longitudinal length is made moldable only by changing the sliding quantity of the slide core 106, the rest can be employed for common use.

Although a description has been given of the exemplary embodiments of the present invention, the use of the molding dies according to the present invention is not limited to molding the two kinds of inner lids, namely, for general use and for business use but applicable to molding various lids different in longitudinal length.

As set forth above, a portion of the die for molding one end of the lid in the longitudinal direction of the lid is formed with the insert type die, and the insert type die corresponding to molding length in the longitudinal direction of the lid is selected and load for injection molding; or otherwise a portion of the die for molding one end of the lid in the longitudinal direction of the lid is formed with the slide core capable of adjusting molding length in the longitudinal direction of the lid, and the slide core is located in a desired position in the longitudinal direction for injection molding. Consequently, another portion of the die for molding the other end of the lid is commonly usable for molding lids having various kinds of length. Therefore, the die can be used commonly for molding lids with the effect of improving the rate of productive operation and making it possible to curtail the cost of manufacturing molding dies.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A molding die for molding at least two kinds of magnetic tape cartridge lids, said lids having a different length in a longitudinal direction thereof, comprising:

a stationary mold unit;

a movable mold unit movable relative to said stationary mold unit;

one of a first insert and a second insert attached to a portion of at least one of said stationary molding unit and said movable molding unit, wherein said first insert attached to said portion of at least one of said stationary molding unit and said movable mold unit defines a molding cavity for a shorter length lid, and said first insert has a recess corresponding with a part of said molding cavity for molding one end of said shorter length lid in the longitudinal direction thereof wherein said second insert attached to said portion of at least one of said stationary molding unit and said movable mold unit defines a molding cavity for a longer length lid, and said second insert has a recess corresponding with a part of said molding cavity for molding one end of said longer length lid in the longitudinal direction thereof; and wherein said first insert and said second insert are alternatively attached to said portion of said at least one of said stationary mold unit and said movable mold unit.

2. The molding die according to claim 1, in which said recess of said first insert is not as deep as said recess of said second insert.

3. The molding die according to claim 1, in which said magnetic tape cartridge lid is selected from a group consisting of an outer lid, a top lid and an inner lid by which a lid assembly for covering a magnetic tape is constituted.

4. The molding die according to claim 1, in which said magnetic tape cartridge lid is said inner lid.

5. A molding die for molding at least two kinds of magnetic tape cartridge lids, said lids having a different length in a longitudinal direction thereof, comprising:

a stationary mold unit;

a movable mold unit movable relative to said stationary mold unit; and a slide core disposed at one end of a molding cavity which is defined by a combination of said stationary mold unit, said movable mold unit and said slide core, said slide core being movable in the longitudinal direction between a first position forming a shorter molding cavity for a shorter length lid between said stationary mold unit and said movable mold unit and a second position forming a longer molding cavity for a longer length lid between said stationary mold unit and said movable mold unit.

6. The molding die according to claim 5, in which said magnetic tape cartridge lid is selected from a group consisting of an outer lid, a top lid and an inner lid by which a lid assembly for covering a magnetic tape is constituted.

7. The molding die according to claim 5, in which said magnetic tape cartridge lid is said inner lid.

* * * * *

UNITED STATES PATENT AND TRADEMARK OFFICE
CERTIFICATE OF CORRECTION

Figure 3:
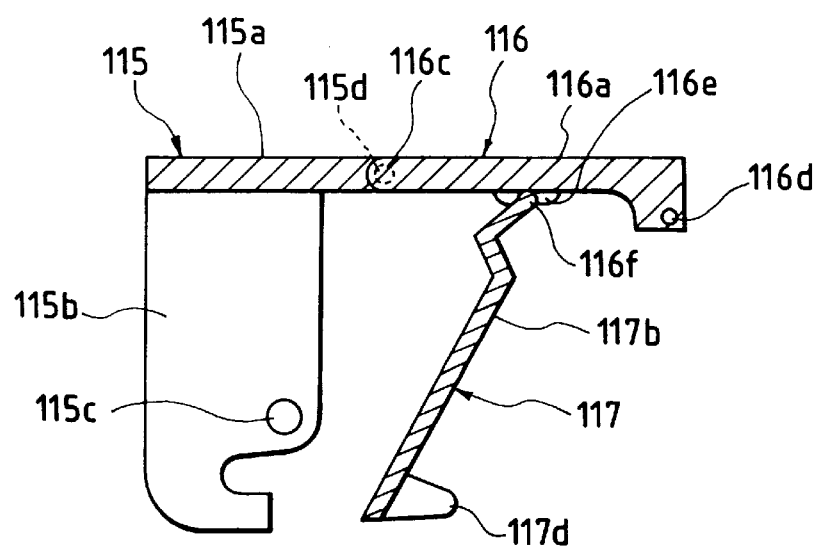
FIG. 3 is a sectional view of the lid portion in the prior art.
Figure 4:
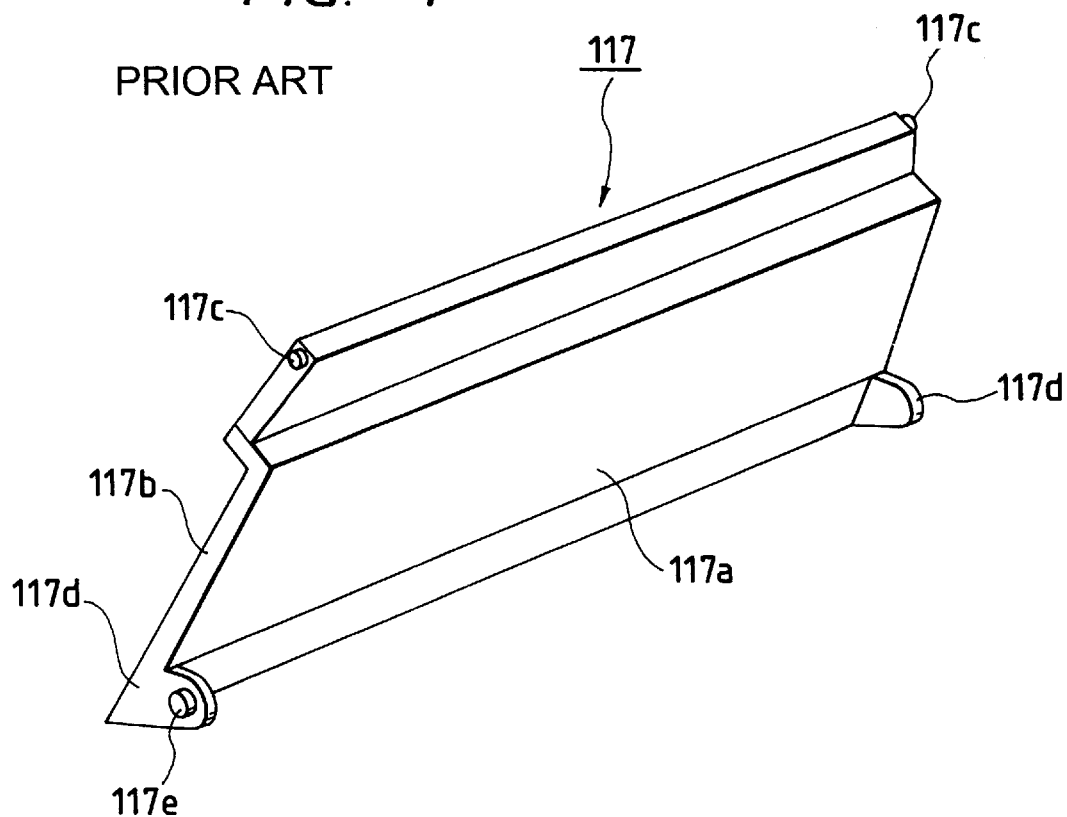
FIG. 4 is a perspective view of an inner lid.
Figure 5:
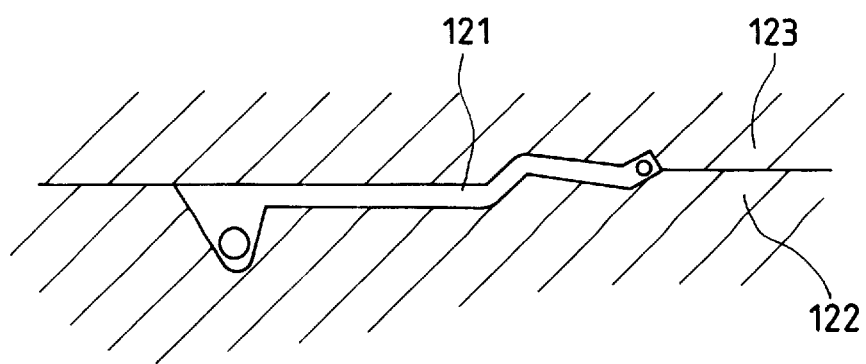
FIG. 5 is a sectional view of a molding die for molding a conventional inner lid.

PATENT NO.   : 6,224,362 B1
DATED        : May 1, 2001
INVENTOR(S)  : Kiyoo Morita, Katsuki Asano and Kazuo Hiraguchi It is certified that error appears in the above-identified patent and that said Letters Patent is hereby corrected as shown below:

<u>Drawings,</u>
Figure 3 should be designated with the legend -- Prior Art --.

Signed and Sealed this

Twenty-first Day of January, 2003

JAMES E. ROGAN
*Director of the United States Patent and Trademark Office*